United States Patent
Jalali et al.

(10) Patent No.: US 7,127,654 B2
(45) Date of Patent: *Oct. 24, 2006

(54) METHOD AND AN APPARATUS FOR A QUICK RETRANSMISSION OF SIGNALS IN A COMMUNICATION SYSTEM

(75) Inventors: Ahmad Jalali, San Diego, CA (US); Eduardo A. S. Esteves, San Diego, CA (US); Nagabhushana T. Sindhushayana, San Diego, CA (US); Peter J. Black, San Diego, CA (US); Rashid A. Attar, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 10/712,582

(22) Filed: Nov. 12, 2003

(65) Prior Publication Data

US 2004/0098657 A1 May 20, 2004

Related U.S. Application Data (63) Continuation of application No. 09/549,017, filed on Apr. 14, 2000, now Pat. No. 6,694,469.

(51) Int. Cl.
G08C 25/02 (2006.01)
H04J 3/24 (2006.01)
H04L 7/00 (2006.01)

(52) U.S. Cl. .................. 714/748; 370/474; 375/758
(58) Field of Classification Search ............. 370/349, 370/342, 330, 469, 436, 474 LIM, 358 LIM; 714/748–750; 375/224, 228, 358
See application file for complete search history.

(56) References Cited

U.S. PATENT DOCUMENTS 5,101,501 A * 3/1992 Gilhousen et al.
5,103,459 A * 4/1992 Gilhousen et al.

(Continued)

FOREIGN PATENT DOCUMENTS

EP 0 771 092 * 5/1997

OTHER PUBLICATIONS

Yamamoto et al., "Viterbi Decoding Algorithm for Convolutaion Coders wih Repeat Request," IEEE Transactions on Information Theory, vol. IT-26, No. 5, Sep. 1980, pp. 540-547.*

*Primary Examiner*—Albert Decady
*Assistant Examiner*—Cynthia Britt
(74) *Attorney, Agent, or Firm*—Philip Wadsworth; Lee Hsu; Sandra L. Godsey (57) ABSTRACT

A method and an apparatus for quick retransmission of signals in a communication system are disclosed. A transmitting terminal, e.g., a base station, transmits signals in a form of packets to a receiving terminal, e.g., a subscriber station. The receiving terminal determines if the packet was intended for the receiving terminal, and if so, the receiving terminal demodulates the packet. The receiving terminal then computes a quality metric of the packet, and compares the computed quality metric with a quality metric contained in the packet. If the quality metrics match, the packet is declared correctly received, and is forwarded for further processing. If the quality metrics fail to match, the receiving terminal sends a request for retransmission of the packet. The transmitting terminal determines which packet needs to be retransmitted based on the request for retransmission. The transmitting terminal then schedules the packet for retransmission.

16 Claims, 6 Drawing Sheets

U.S. PATENT DOCUMENTS 5,677,918 A * 10/1997 Tran et al.
5,710,784 A * 1/1998 Kindred et al.
5,784,362 A * 7/1998 Turina
6,359,904 B1 * 3/2002 Hamalainen et al.
6,370,153 B1 * 4/2002 Eng
6,377,562 B1 * 4/2002 Schneider
6,574,211 B1 * 6/2003 Padovani et al.

* cited by examiner

METHOD AND AN APPARATUS FOR A QUICK RETRANSMISSION OF SIGNALS IN A COMMUNICATION SYSTEM

CLAIM OF PRIORITY UNDER 35 U.S.C. §120

The present Application for Patent is a Continuation and claims priority to patent application Ser. No. 09/549,017, entitled "METHOD AND AN APPARATUS FOR A QUICK RETRANSMISSION OF SIGNALS IN A COMMUNICATION SYSTEM" filed Apr. 14, 2000, now U.S. Pat. No. 6,694,469 now allowed, and assigned to the assignee hereof and hereby expressly incorporated by reference herein.

BACKGROUND

1. Field

The current invention relates to communication. More particularly, the present invention relates to a novel method and apparatus for quick retransmission of signals in a communication system.

2. Background

In a communication system, a communication channel through which signals travel between transmitting and receiving terminals is subject to various factors, changing characteristics of the communication channel. In wireless communication systems these factors comprise, but are not limited to: fading, noise, interference from other terminals, and the like. Consequently, despite extensive error control coding, certain packets are missed or received erroneously at a receiving terminal. Unless defined differently, a packet is a unit of a signal comprising a preamble, a payload, and a quality metric. Therefore, Automatic Retransmission reQuest (ARQ) schemes are often used at the link layer of communication systems to detect missing or erroneously received packets at the receiving terminal, and request retransmission of these packets at the transmitting terminal. An example of an ARQ is a Radio Link Protocol (RLP). RLP is a class of error control protocols known as NAK-based ARQ protocols, which are well known in the art. One such RLP is described in TIA/EIA/IS-707-A.8, entitled "DATA SERVICE OPTIONS FOR SPREAD SPECTRUM SYSTEMS: RADIO LINK PROTOCOL TYPE 2," hereinafter referred to as RLP2, and incorporated herein by reference.

Existing ARQ schemes achieve retransmission of missing or erroneously received packets by utilizing a sequence number unique to each packet. When a receiving terminal detects a packet with a sequence number higher than an expected sequence number, the receiving terminal declares packet(s) with sequence number(s) between the expected sequence number and the detected packet's sequence number missing or erroneously received. The receiving terminal then sends a control message requesting retransmission of the missing packets to a transmitting terminal. Alternatively, the transmitting terminal may resend the packet after a certain timeout interval if the transmitting terminal has not received a positive acknowledgement from the receiving terminal.

Consequently, existing ARQ schemes cause a large delay between the first transmission of a packet and a subsequent retransmission. The ARQ does not declare a particular packet missing or erroneously received until the next packet, containing a sequence number higher then an expected sequence number is received or until the timeout interval expires. This delay results in a large variance in the end-to-end delay statistics, which has a further detrimental effect on the network throughput. Transport layer protocols, such as the transport control protocol (TCP), implement a congestion control mechanism, which reduces the number of outstanding packets in a network based on the variance of the round-trip delay estimate. In effect, larger variance of delay results in a reduction of the amount of traffic that is admitted into the network and a subsequent reduction in throughput of a communication system.

One approach to reducing the delay and the delay's variation is to avoid retransmissions by ensuring that the first transmission is received correctly with high probability. However, this approach requires a large amount of power, which in turn reduces throughput.

Based on the foregoing, there exists a need in the art for an ARQ mechanism with low retransmission delay.

SUMMARY

The present invention is directed to a method and an apparatus for quick retransmission (QARQ) of signals in a communication system.

In accordance with one aspect of the invention, a receiving terminal determines a quality metric of a packet of received signal. The receiving terminal immediately sends a short acknowledgement (SA) to a transmitting terminal in accordance with the quality metric of the packet. If the quality metric indicates that the packet was incorrectly received, then the SA is termed negative acknowledgement (NAK); otherwise, the SA is termed positive acknowledgement (ACK) or acknowledgement.

In another aspect of the invention, there exists a determinable relationship between a particular packet and the SA; therefore, there is no need for the SA to contain an explicit indication as to which packet is to be retransmitted.

In accordance with another aspect of the invention, the SA is a bit of energy.

In accordance with another aspect of the invention, the transmitting terminal attempts retransmission of the packet a predetermined number of times.

In accordance with yet another aspect of the invention, a conventional, sequence-number-based ARQ is employed together with the QARQ scheme.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
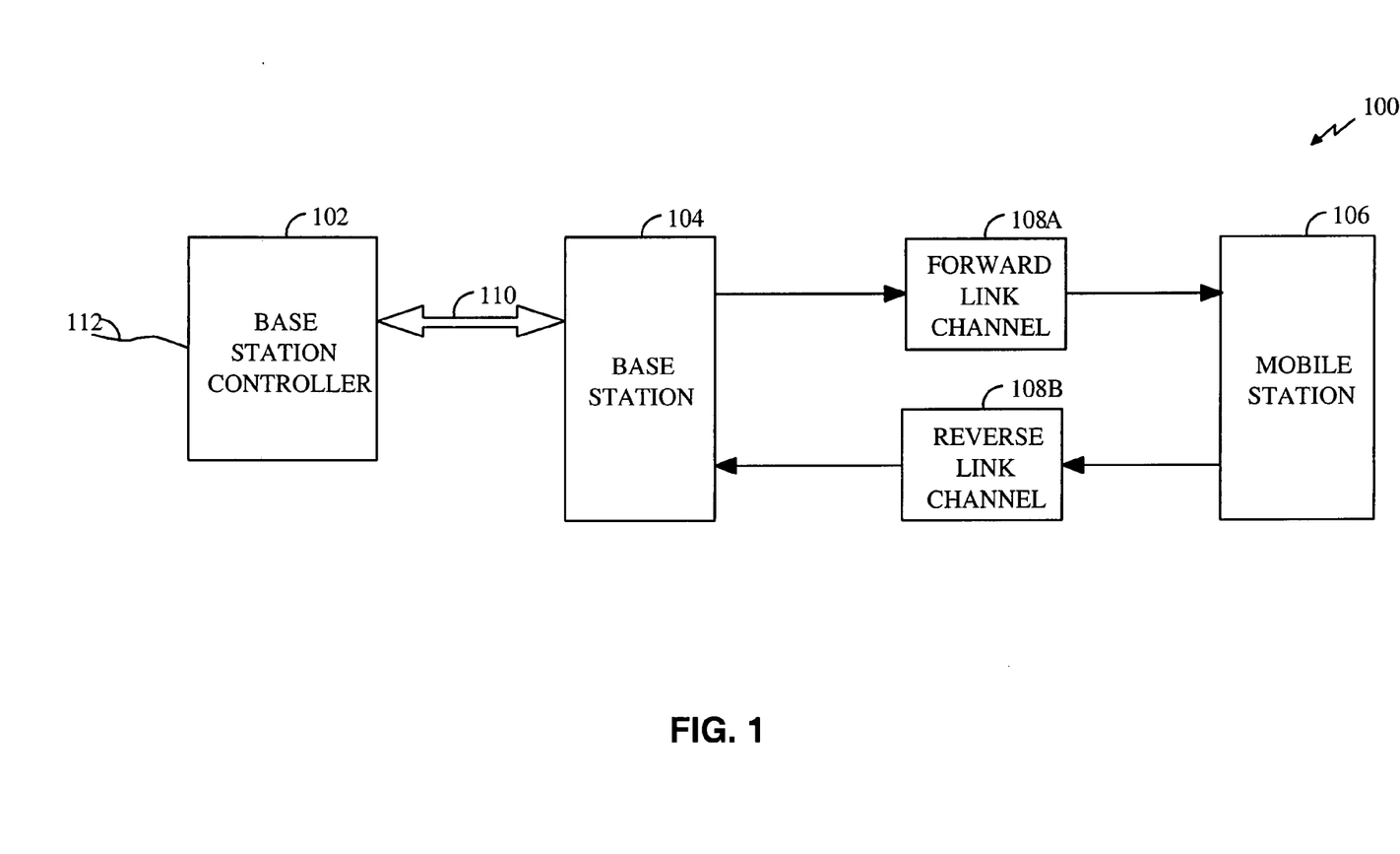
FIG. 1 is a block diagram of an exemplary communication system.

FIG. 1 illustrates an exemplary communication system 100 capable of implementing embodiments of the invention.

A first terminal 104 transmits signals to a second terminal 106 over a forward link 108*a*, and receives signals from the second terminal 106 over a reverse link 108*b*. The communication system 100 can be operated bi-directionally, each of the terminals 104 and 106 operating as a transmitter unit or a receiver unit, or both concurrently, depending on whether data is being transmitted from, or received at, the terminal. In a wireless cellular communication system embodiment, the first terminal 104 can be a base station (BS), the second terminal 106 can be a mobile station (MS) such as a phone, a laptop computer, a personal digital assistant and the like. The forward link and reverse link can be electromagnetic spectra.

In general, a link comprises a set of channels carrying logically distinct types of information. These channels can be transmitted according to a time division multiplex (TDM) scheme, a code division scheme (CDM), or a combination of the two. In the TDM scheme, the channels are distinguished in time domain. The forward link consists of time slots in a periodic train of time intervals, and the channels are transmitted in the time slots. Consequently, the channels are transmitted one at a time. In the code division scheme, the channels are distinguished by a pseudorandom orthogonal sequence; consequently, the channels can be transmitted simultaneously. A code division scheme is disclosed in U.S. Pat. Ser. No. 5,103,459, entitled "SYSTEM AND METHOD FOR GENERATING SIGNAL WAVEFORMS IN A CDMA CELLULAR TELEPHONE SYSTEM" assigned to the assignee of the present application and incorporated by reference herein.

In one embodiment of the invention, a forward link comprises a set of channels, e.g., a pilot channel, a medium access channel, a traffic channel, and a control channel. The control channel is a channel carrying signals to be received by all MSs monitoring the forward link. In one embodiment of the invention, data being carried on the traffic channel, including both first time transmissions and quick retransmissions, can be demodulated without information provided on a control channel. In another embodiment, the control channel may carry information necessary for demodulation of the data being carried on the traffic channel. For a forward link signal structure of an exemplary embodiment of the invention, refer to FIG. 2.

In one embodiment of the invention, the reverse link comprises a set of channels, e.g., a traffic channel and an access channel. The reverse traffic channel is dedicated to transmission from a single MS to the BSs comprising a network. The reverse access channel is used by the MSs to communicate with the BSs in the network when the MSs do not have traffic channel.

For simplicity, communication system 100 is shown to include one BS 104 and one MS 106 only. However, other variations and configurations of the communication system 100 are possible. For example, in a multi-user, multiple access communication system, a single BS may be used to concurrently transmit data to a number of MSs. In addition, in a manner similar to soft-handoff, disclosed in U.S. Pat. Ser. No. 5,101,501, entitled "METHOD AND SYSTEM FOR PROVIDING A SOFT HANDOFF IN COMMUNICATIONS IN A CDMA CELLULAR TELEPHONE SYSTEM," assigned to the assignee of the present application and incorporated by reference herein, a MS may concurrently receive transmissions from a number of BSs. The communication system of the embodiments described herein may include any number of BSs and MSs. Consequently, each of the multiple BSs is connected to a base station controller (BSC) 102 through a backhaul similar to backhaul 110. The backhaul 110 can be implemented in a number of connection types including, e.g., a microwave or wire-line E1 or T1, or optical fiber. A connection 112 connects the wireless communication system 100 to a public switched data network (PSDN), which is not shown.

In an exemplary embodiment, each MS monitors signal quality metric of signals received from BSs. A MS (for example MS 106) receiving forward link signals from multiple BSs identifies the BS associated with the highest quality forward link signal (for example BS 104). The MS 106 then generates a prediction of a data rate at which the packet error rate (PER) of packets received from the selected BS 104 will not exceed a target PER. An exemplary embodiment uses a target PER of approximately 2%. The 106 then computes a rate at which a "tail probability" is greater than or equal to the target PER. The tail probability is the probability that the actual signal quality during the packet transmission period is less than the signal quality required for successful decoding of a packet correctly at a given rate. The MS 106 then sends a message on the reverse link specifically to the selected BS 104, requesting data rate at which the specific selected base station may transmit forward link data to the MS 106.

In one embodiment of the invention, the message is sent on a data rate control channel (DRC). DRC is disclosed in application Ser. No. 08/963,386 entitled: "A METHOD AND AN APPARATUS FOR HIGH RATE DATA TRANSMISSION," now U.S. Pat. No. 6,574,211, issued Jun. 3, 2003, assigned to the assignee of the present invention, and incorporated herein by reference.

In another embodiment of the invention, a dedicated reverse link medium access channel (R-MACCH) is utilized. The R-MACCH carries the DRC information, a reverse rate indicator (RRI) and a SA information.

In an exemplary embodiment, the BS 104 monitors the reverse channel from one or more MSs and transmits data on forward link to no more than one destination MS during each forward link transmit time slot. The BS 104 selects a destination MS (for example MS 106) based on a scheduling procedure designed to balance the grade of service (GoS) requirements of each MS with the desire to maximize throughput of the system 100. In an exemplary embodiment, the BS 104 transmits data to the destination MS 106 only at the rate indicated by the most recent message received from the destination MS. This restriction makes it unnecessary for the destination MS 106 to perform rate detection on the forward link signal. The MS 106 need only determine whether it is the intended destination MS during a given time slot.

In an exemplary embodiment, BSs transmit a preamble within the first time slot of each new forward link packet. The preamble identifies the intended destination MS. Once a destination MS establishes that it is the intended destination for data in a slot, the MS begins decoding the data in the associated time slot. In an exemplary embodiment, the destination MS 106 determines the data rate of the data in the forward link based on the request message the MS 106 sent. The number of forward link time slots used to transmit a packet varies based on the data rate at which the packet is sent. Packets sent at a lower rate are sent using a greater number of time slots.

Once the MS 106 determines that the data are intended for the MS 106, the MS 106 decodes the packet and evaluates a quality metric of the received packet. Quality metric of a packet is defined by a formula in accordance with a content of the packet, e.g., a parity bit, a cyclic redundancy check (CRC), and the like. In one embodiment of the invention, the quality metric is a CRC. The evaluated quality metric and the quality metric contained in the received packet are compared, and based on the comparison an appropriate SA is generated. As discussed with reference to FIG. 5, the SA in an exemplary embodiment can comprise only one bit.

In one embodiment, the SA is ACK based, i.e., an ACK message is sent from a MS to a BS if a packet is correctly decoded and no message is sent is the packet is incorrectly decoded.

In another embodiment the SA is NAK based, i.e., a NAK message is sent from a MS to a BS if a packet is incorrectly decoded, and no message is sent is the packet is correctly decoded. An advantage of this approach is that high reliability and low noise interference with other reverse links, as well as energy saving at the MS, can be achieved. As discussed, because a BS is transmitting a packet intended to only one MS, at most this MS sends NAK, thus achieving a low interference on the reverse link. In a well-designed system, the probability of the MS incorrectly decoding the packet is low. Furthermore, if the NAK is a bit of zero energy, the NAK contains low energy. Therefore, the MS can allocate large amounts of power to the infrequent transmission of the NAK bit.

In yet another embodiment, an ACK is a first value of energy and a NAK is a second value of energy.

The SA is then sent to the BS 104 over a channel on the reverse link 108B. In one embodiment of the invention, the reverse link channel is a DRC.

In another embodiment of the invention, a code channel orthogonal to the reverse link can be advantageously utilized. Because a BS is transmitting a packet intended for only one MS, at most this MS sends a SA, thus achieving a low interference on the reverse link. In a well-designed system, the probability of the MS incorrectly decoding the packet is low. Furthermore, if the SA is an ACK as a bit of zero energy or a NAK as a bit of zero energy, the orthogonal channel contains low energy. Therefore, the MS can allocate large amount of power to the infrequent transmission of the SA bit, guaranteeing high reliability and low interference with the reverse link.

In yet another embodiment of the invention, a dedicated reverse link medium access channel (R-MACCH) is utilized. The R-MACCH carries the DRC, the RRI and the ACK/NAK information.

The BS 104 detects the SA and determines whether a retransmission of the packet is necessary. If the SA indicates that a retransmission is necessary, the packet is scheduled for retransmission, otherwise, the packet is discarded.

In an exemplary embodiment, the aforementioned QARQ scheme cooperates with the RLP as will be disclosed in the following description.

Figure 2:
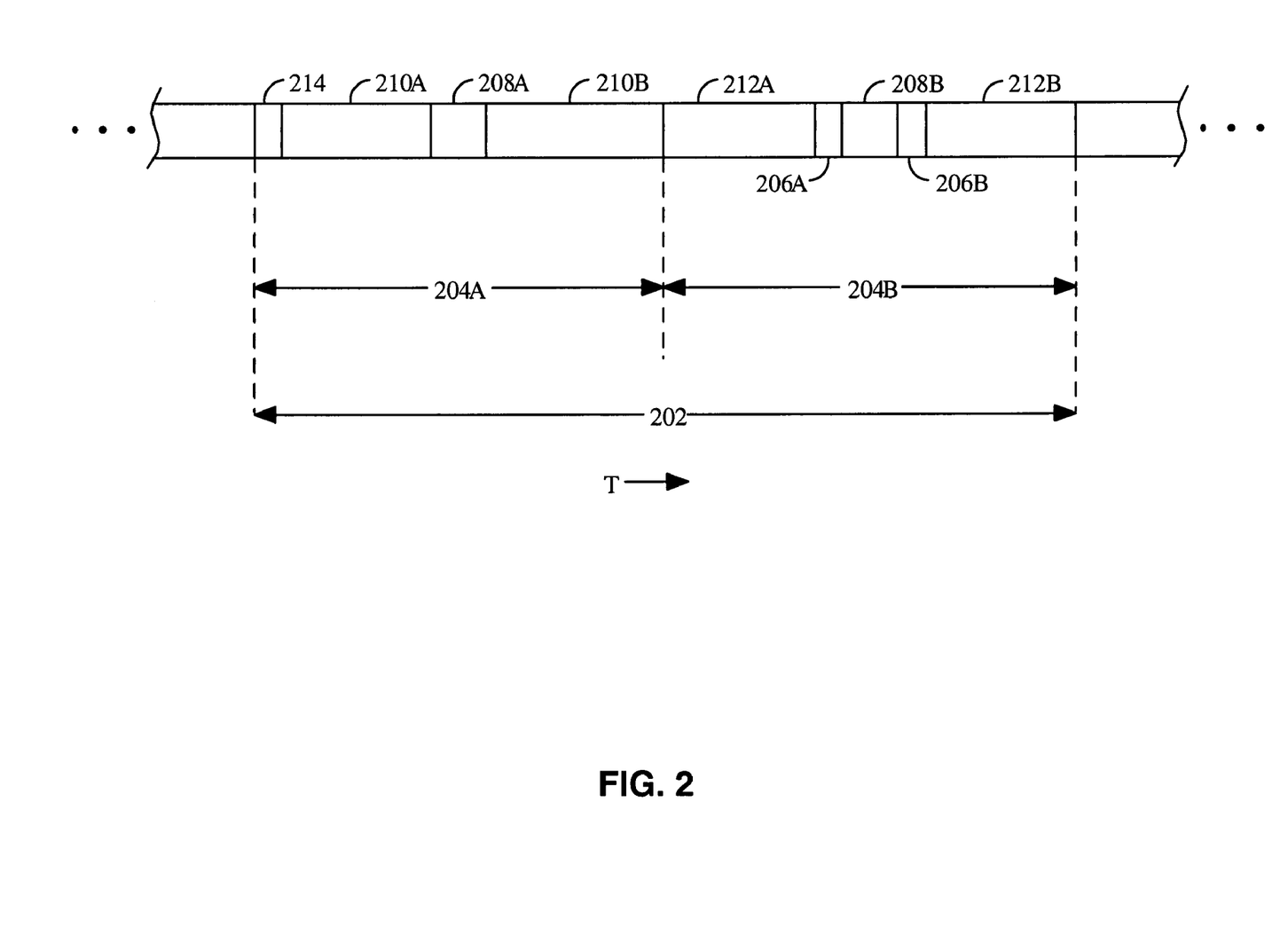
FIG. 2 is an illustration of an exemplary forward link signal structure.

FIG. 2 shows the forward link signal structure transmitted by each base station in an exemplary high data rate system. Forward link signals are divided into fixed-duration time slots. In an exemplary embodiment, each time slot is 1.67 milliseconds long. Each slot 202 is divided into two half-slots 204, with a pilot burst 208 transmitted within each half-slot 204. In an exemplary embodiment, each slot is 2048 chips long, corresponding to a 1.67 millisecond slot duration. In an exemplary embodiment, each pilot burst 208 is 96 chips long, and is centered at the mid-point of its associated half-slot 204. A reverse link power control (RPC) signal 206 is transmitted to either side of the pilot burst in every second half-slot 204B. In an exemplary embodiment, the RPC signal is transmitted in the 64 chips immediately before and the 64 chips immediately after the second pilot burst 208B of each slot 202, and is used to regulate the power of the reverse link signals transmitted by each subscriber station. In an exemplary embodiment, forward link traffic channel data are sent in the remaining portions of the first half-slot 210 and the remaining portions of the second half-slot 212. In an exemplary embodiment, preamble 214 is 64 chips long and is transmitted with each packet. Because the traffic channel stream is intended for a particular MS, the preamble is MS specific.

In an exemplary embodiment, a control channel is transmitted at a fixed rate of 76.8 kbps and the control channel is time division multiplexed on the forward link. Because the control channel messages are directed to all MSs, the control channel's preamble is recognizable by all the MS.

Figure 3:
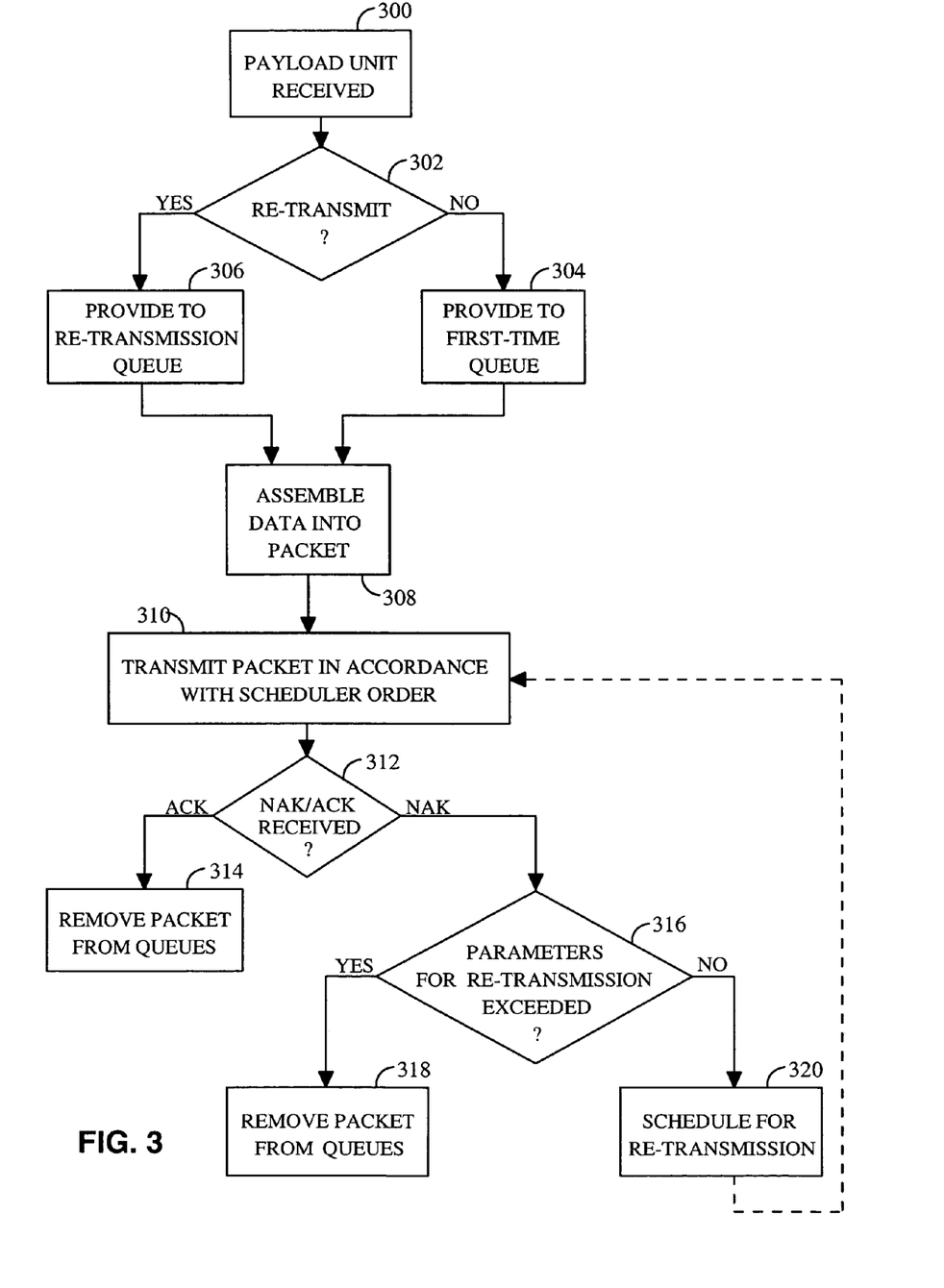
FIG. 3 is a flowchart of an exemplary method of data processing at the transmitting terminal.

FIG. 3 is an exemplary flowchart of a method for a BS using QARQ to transmit or retransmit a packet to a MS. At step 300, the BS receives a payload unit intended for transmission to a MS.

At step 302 the BS determines whether the payload unit is a payload unit to be transmitted or a payload unit to be retransmitted. As discussed with reference to FIG. 1, the retransmission request can be initiated only by the RLP at this step.

If the payload unit is to be transmitted, the method continues in step 304, in which the payload unit is provided to a first time queue.

If the payload unit is to be retransmitted, the method continues in step 306, in which the payload unit is provided to a retransmission queue.

At step 308, the BS assembles payload units intended for a particular MS to a packet a structure of which is determined in accordance with a transmission data rate. The data rate at which the packet is sent is based on a feedback signal received over the reverse link from the destination MS. If the data rate is small, then the packet (called a multiple-slot packet) of data is transmitted in multiple forward link time slots. In an exemplary embodiment, a preamble is transmitted within a new packet. The preamble enables identification of the intended destination MS during decoding. In an exemplary embodiment, only the first time slot of the multiple-slot packet is transmitted with the preamble. The preamble could alternatively be transmitted in every forward link time slot.

At step 310, the BS transmits the packet in accordance with a scheduler order as discussed with reference to FIG. 1.

After the packet has been transmitted, the BS tests at step 312 if a SA corresponding to the transmitted packet was received. As disclosed with reference to FIG. 6, the BS knows when to expect the SA.

If an ACK is received (or a NAK is not received) in the expected time slot, the method continues at step 314. At step 314, the packet is removed from the first time slot and the retransmission queues, and the packet is discarded.

If a NAK is received (or an ACK is not received) in the expected time slot, the method continues at step 316. At step 316, parameters controlling retransmission are tested. The parameters assure that a particular packet will not be retransmitted repeatedly, thus increasing buffer requirements and decreasing throughput of a communication system. In one embodiment, the parameters comprise, e.g., the maximum number of times a packet can be retransmitted and the maximum time for which a packet can remain in the first-time queue after the packet has been transmitted. If the parameters were exceeded, the packet is removed from the first time and the retransmission queues, and the packet is discarded at step 318. In this scenario, the QARQ retransmission processing ends, and the packet may be retransmitted upon request from the RLP processor as discussed with reference to FIG. 6. If the parameters were not exceeded, the packet is rescheduled for retransmission at step 320.

Figure 4:
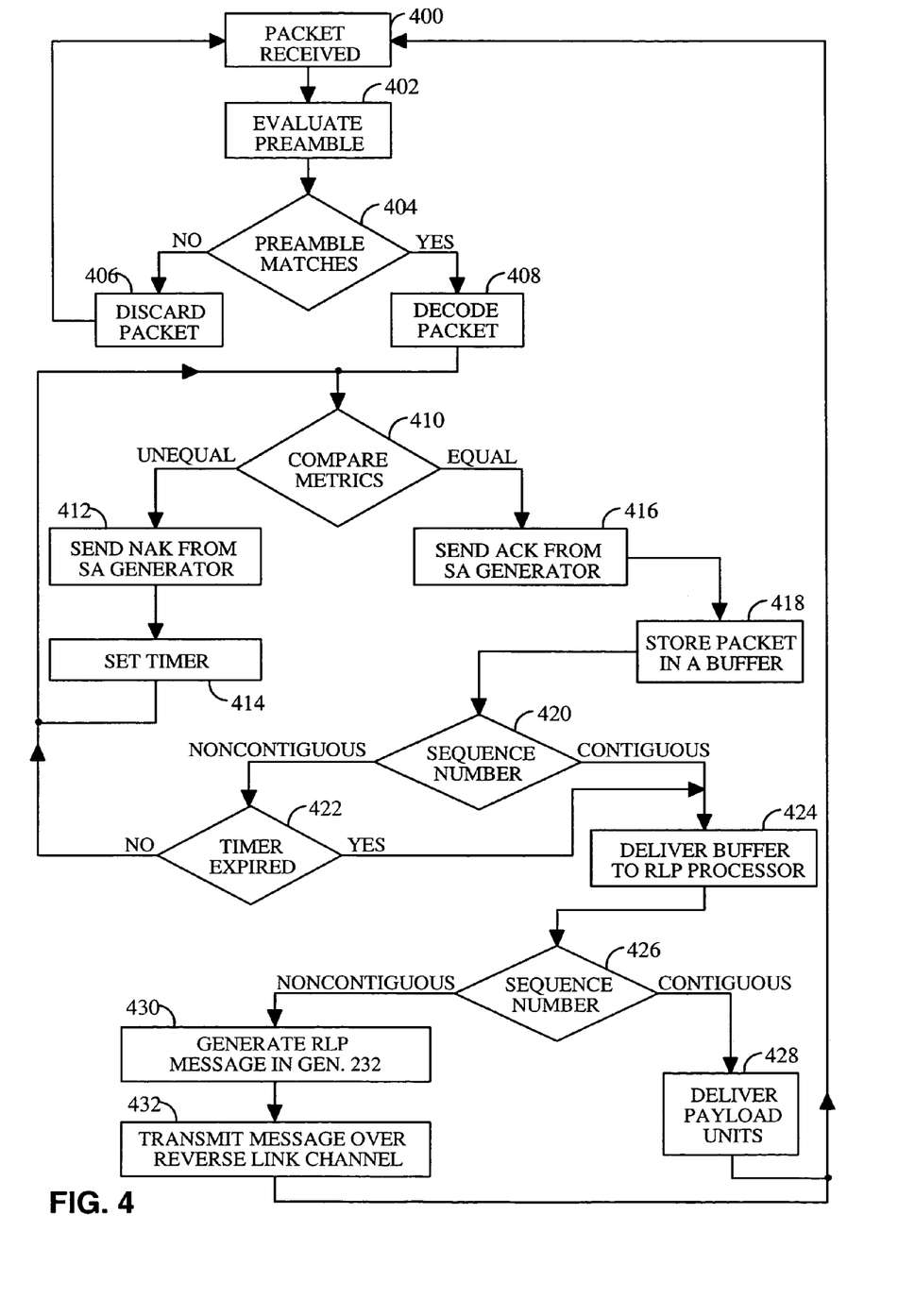
FIG. 4 is a flowchart of an exemplary method of data processing at a receiving terminal.

FIG. 4 is an exemplary flowchart of a method for a MS using QARQ to generate a response to a BS. At step 400, the MS receives a packet from the BS.

At step 402, the preamble of the packet is extracted. The preamble is compared with a reference preamble at step 404. The packet is discarded if the preamble indicates that the packet is intended for another MS at step 406, and the flow returns to step 400 to wait for another packet. If the preamble indicates that the packet is intended for the MS, the MS decodes the packet and evaluates a quality metric of the received packet at step 408.

At step 410, the evaluated quality metric and the quality metric contained in the received packet are compared. If the evaluated quality metric and the quality metric contained in the received packet do not match, an appropriate SA is sent at step 412. In the exemplary embodiment, the SA is a NAK, represented by a bit of non-zero energy. A timer for the SA sent is started at step 414. The purpose of the timer is to limit a period for which the MS waits for retransmission of the payload units of the incorrectly decoded packet. In the exemplary embodiment, if the payload units of the incorrectly decoded packet are not received within the timer expiration period for the NAK associated with the incorrectly decoded packet, the QARQ processing is aborted, and the RLP handles the missing payload units. See steps 416–432 and accompanying description.

If a packet was correctly decoded at step 410, an appropriate SA is sent at step 416. In an exemplary embodiment, the SA is a bit of no energy. The payload unit(s) contained in the packet are then stored in a buffer at step 418.

At step 420, the RLP sequence number of the payload units is tested against expected values of the RLP sequence number.

If the RLP sequence number indicates contiguity, it means that all the payload units of the packet transmitted to the MS were properly received. Consequently, all the payload units with contiguous sequence numbers contained in the buffer are provided to an RLP layer at step 420.

If the RLP sequence number indicates non-contiguity, the timer, corresponding to the last NAK sent (which was started at step 414), is checked at step 422. If the timer has not expired, the MS waits for retransmission of the missing payload units or expiration of the timer for the last NAK sent.

If the timer for a particular NAK, and, consequently a particular set of missing payload unit expired, the QARQ scheme for these payload units is aborted. All payload units stored in the buffer with sequence number higher than the missing payload units associated with the particular NAK and lower than the missing units associated with the next NAK (if any) are provided to an RLP layer at step 424.

At step 426, the RLP layer checks the sequence numbers of the delivered payload units. If the sequence number indicates contiguity, the RLP layer delivers data from the buffer to a data sink at step 428. Otherwise, the RLP layer generates RLP messages requesting retransmission of the missing units at step 430. In one embodiment of the invention, the RLP message requests retransmission of all of the missing units in the buffer. In another embodiment, the message requests retransmission of only the latest detected missing payload units.

At step 432, the message is transmitted over the reverse link to the serving BS.

Figure 5:
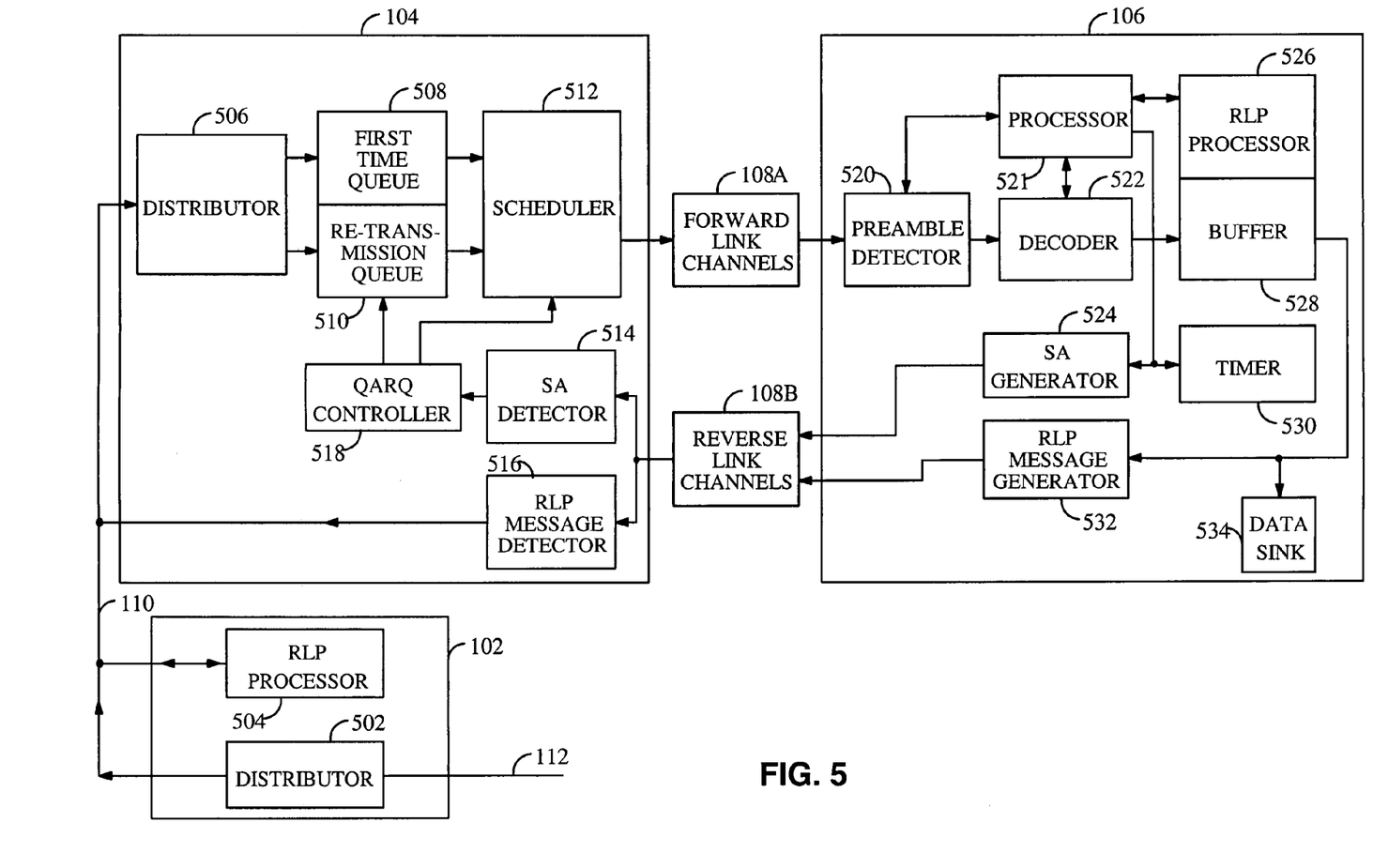
FIG. 5 is a detailed block diagram of the communication system of FIG. 1.

FIG. 5 shows a detailed block diagram of the communication system 100 of FIG. 1. Data to be delivered to the MS 106 arrive at the BSC 102 through the connection 112 from the PSDN (not shown). The data are formatted into payload units under the control of a RLP processor 504. Although an RLP processor is shown in the embodiment, other protocols, allowing retransmission based on sequence number methods can be utilized. In one embodiment of the invention, the payload unit is 1024 bits long. The RLP processor 504 also supplies a distributor 502 with information as to which packets have been requested for retransmission. The retransmission request is delivered to the RLP processor 504 through the RLP message. The distributor 502 distributes payload units through a backhaul to the BS, which serves the MS for which the data are intended. The distributor 502 receives information about location of the MS from the BS which serves the MS through the backhaul.

The payload units that arrived at the BS 104 through the backhaul 110 are provided to a distributor 506. The distributor 506 tests whether the payload units are new payload units or payload units provided by the RLP processor 504 for retransmission. If the payload units are to be retransmitted, the payload units are provided to a retransmission queue 510. Otherwise, the payload units are provided to a first time queue 508. The payload units are then assembled into packets in accordance with a data rate requested by the MS 106, as described with reference to FIG. 1.

Assembled packets are provided to a scheduler 512. The scheduler 512 cooperates with a QARQ controller 518 on assigning priority between the first time packets and the packets intended for retransmission to the MS 106. The packet transmitted to the MS 106 remains in the queues 508 and 510, while the BS 104 waits for a SA from the MS 106.

The packets arriving at the MS 106 over the forward link 108A are provided to a preamble detector 520, which detects and decodes a preamble of the packets. The preamble is provided to a processor 521, which compares the decoded preamble to a reference preamble. The packet is discarded if the preamble indicates that the packet is intended for another MS; otherwise, the packet is provided to a decoder 522, which decodes the packet. The decoded packet is provided to a processor 521, which evaluates a quality metric of the packet. The evaluated quality metric and the quality metric contained in the received packet are compared, and based on the comparison, an SA generator 526 generates an appropriate SA. Though the preamble detector 520, the decoder 522, and the processor 521 are shown as separate elements, one skilled in the art will appreciate that the physical distinction is made for explanatory purposes only. The preamble detector 520, the decoder 522, and the processor 521 may be incorporated into, single processor accomplishing the above-mentioned processing.

If a packet was incorrectly decoded, i.e., the evaluated quality metric and the quality metric contained in the received packet do not match, the SA is sent and a timer 530 for the SA is started. In the exemplary embodiment, the SA is a NAK represented by a bit of non-zero energy. The purpose of the timer 530 is to limit a period, for which the MS 106 waits for retransmission of the payload units of the incorrectly decoded packet. If the payload units of the incorrectly decoded packet are not received within the timer 530 expiration period for the NAK associated with the incorrectly decoded packet, the QARQ processing is aborted. A retransmission of the missing payload units is handled by an RLP.

If a packet was correctly decoded, the payload unit(s) contained in the packet are stored in a buffer 528. The RLP sequence number of the payload unit(s) contained in the packet is checked by the decoder 522 against an expected value of the RLP sequence number. If the RLP sequence number indicates contiguity, all the payload units with contiguous sequence numbers contained in the buffer 528 are provided to a RLP processor 526. Otherwise, the timer 530, corresponding to the last NAK sent, is checked. If the time has not expired, the payload units are stored in the buffer 528, and the MS 106 waits for retransmission of the missing payload units or expiration of the timer 530 for the last NAK sent. If the timer 530 for a particular NAK, and, consequently a particular set of missing payload unit expired, all payload units in the buffer 528 with sequence number higher than the missing units associated with the particular NAK and lower than the missing units associated with the next NAK—if any—are provided to a RLP processor 526.

The RLP processor 526 checks the sequence numbers of the delivered payload units. If the sequence number indicates contiguity, the RLP processor 524 delivers data from the buffer 528 to the data sink 534. Otherwise, the RLP processor 526 instructs RLP message generator 532 to generate RLP message requesting retransmission of the missing units. In one embodiment of the invention, the RLP message requests retransmission of all of the missing units in the buffer 528. In another embodiment, the message requests retransmission of only the latest detected missing payload units. The message is then transmitted over the reverse link 108B to the BS 104.

The data containing a SA and arriving at the BS 104 over the reverse link are provided to a SA detector 514 and an RLP message detector 516.

If the received data contain an ACK, which is detected in a SA detector 514, the QARQ controller 518 removes the packet associated with the ACK from the queues 508 and 510.

If a NAK is received, the QARQ controller 518 checks whether parameters controlling retransmission were exceeded. In the exemplary embodiment, the parameters comprise a maximum number of times a packet can be retransmitted and a maximum time for which a packet can remain in the first-time queue 508 after the packet has been transmitted. If the parameters were exceeded, the QARQ controller 518 removes the packet form the queues 508 and 510. Otherwise, the QARQ controller 518 instructs the scheduler 512 that the packet be rescheduled for transmission with higher priority. The packet is moved from the first-time queue 508 to the retransmission queue 510 if the QARQ controller 518 determines that the non-acknowledged packet resides in the first time queue 510.

If the received data contain an RLP retransmission request, which is detected by an RLP message detector 516, the RLP message detector 516 provides the RLP message to the RLP processor 504 through the backhaul 110. The RLP processor then initiates the procedure for re-transmitting the packet in accordance with the RLP implemented.

Figure 6:
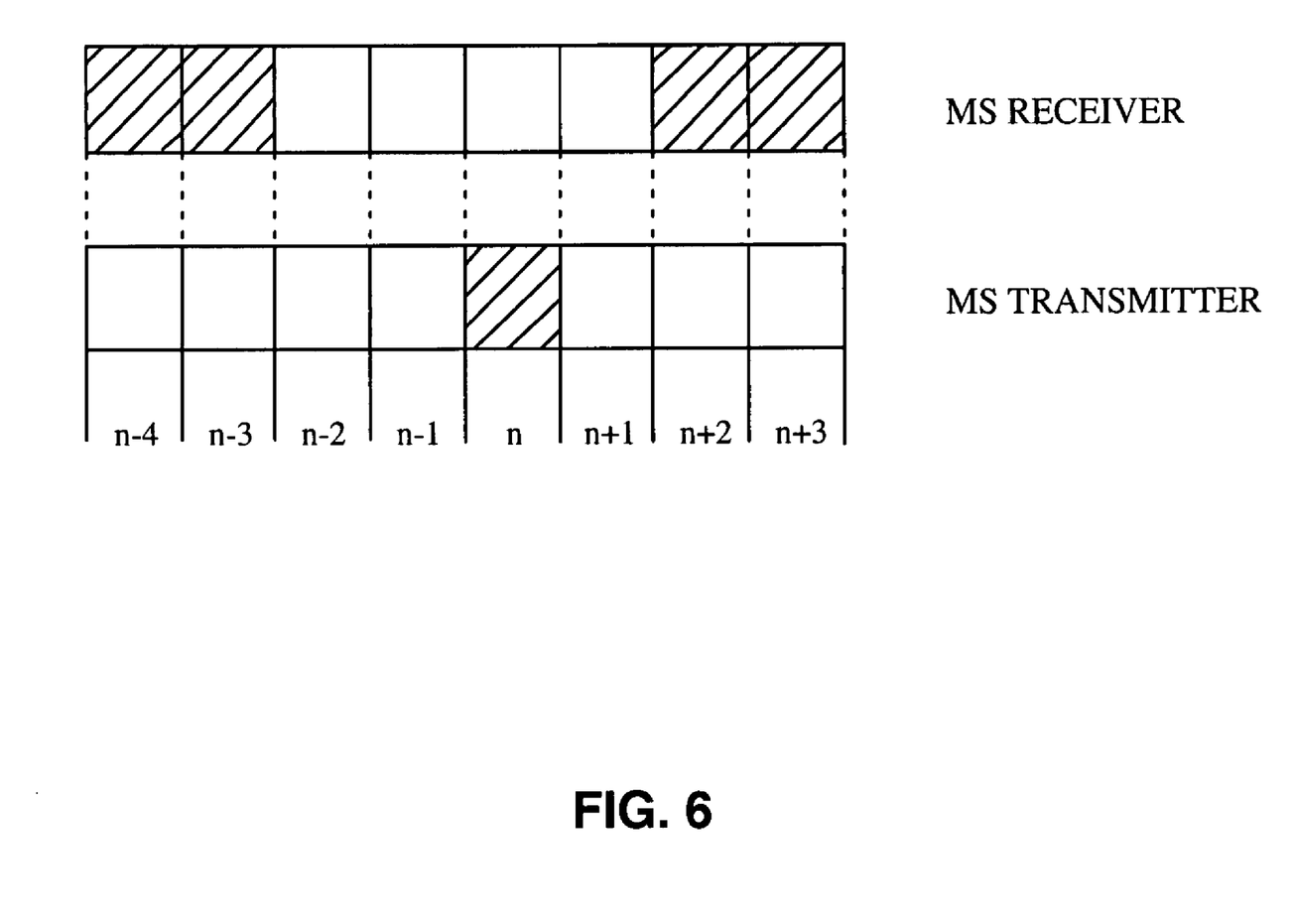
FIG. 6 is a diagram showing timing associated with packet processing at a receiving terminal in accordance with an embodiment of the invention.

FIG. 6 illustrates a relationship between a packet received at a MS 106 and a SA transmitted from the MS 106. In slots n−4, n−3, a receiver at the MS 106 receives a packet over the forward channel link 108A, and determines if the packet was intended for the MS 106. The MS 106 discards the packet if the packet was not intended for the MS 106. Otherwise, the MS 106 decodes the packet, evaluates a quality metric of the packet, and compares the evaluated quality metric with the quality metric contained in the packet in slots n−2, n−1. In slot n, a transmitter at the MS 106 sends a SA back to the BS 104 over the reverse channel link 108B. In slot n+1, the SA received at the BS 104 is decoded and provided to a QARQ controller. In slots n+2, n+3 the BS 104 retransmits the packet if so requested. The position of the slots on the received forward link channel 108A and the reverse link channel 108B is synchronized at the MS 106. Therefore, the relative position of slots on the forward channel link 108A and the reverse channel link 108B is fixed. The BS 104 can measure a round trip delay between the BS 104 and the MS 106. Consequently, the time slot in which the SA must arrive at the BS 104 can be ascertained, provided that a relation between the received packet processing and the SA is determinable.

In one embodiment of the invention, the relation between the received packet processing and the SA is determinable by fixing the number of slots between receiving a packet and sending a SA back, i.e., slots n−2, n−1. Consequently, the BS 104 can associate each packet with each SA. One skilled in the art will understand that FIG. 5 is meant only to illustrate the concept. Consequently, the number of slots allocated for a particular event may change, e.g., decoding and evaluating of a packet's quality metric may occur in more or less than two slots. Furthermore, certain events are inherently variable, e.g., length of a packet, delay between the SA reception and the packet retransmission.

In another embodiment of the invention, the relation between the received packet processing and the SA is determinable by including information as to which packet is to be retransmitted into the SA.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

What is claimed is:

1. An apparatus for retransmitting signals, comprising:
   means for decoding contents of a unit of received signal;
   means for generating a feedback signal; means for determining a quality metric of said unit of received signal;
   means for instructing said means for generating said feedback signal to generate said feedback signal in accordance with said quality metric; and means for preventing decoding of said unit of received signal if an indication received on a control channel indicates that said unit of received signal is not to be decoded.

2. The apparatus of claim 1, wherein said unit of received signal is a packet.

3. The apparatus of claim 1, wherein said quality metric is a cyclic redundancy check.

4. An apparatus configured to retransmit signals, comprising:
   means for decoding contents of a unit of received signal;
   means for generating a feedback signal;
   means for determining a quality metric of said unit of received signal;
   means for instructing said means for generating said feedback signal to generate said feedback signal in accordance with said quality metric;
   means for detecting a preamble of said unit of received signal; and
   means for preventing decoding of said unit of received signal if said preamble indicates that said unit of received signal is not to be decoded.

5. The apparatus of claim 4, wherein said contents of said unit of received signal are decoded in accordance with information carried on a control channel.

6. The apparatus of claim 4, wherein said feedback signal is a burst of energy.

7. The apparatus of claim 6, wherein said burst of energy is a bit.

8. The apparatus of claim 4, wherein said feedback signal contains no energy.

9. The apparatus of claim 8, wherein said first feedback signal is a bit.

10. The apparatus of claim 4, further comprising means for transmitting said feedback signal at a determinable time instant.

11. The apparatus of claim 10, wherein said determinable time instant is fixedly delayed from an event time instant, said event time instant being selected from a group consisting of:
   a time instant when said unit of signal is received;
   a time instant when a determination of whether said unit of signal is to be demodulated is made;
   a time instant when said unit of signal is demodulated; and
   a time instant when said quality metric is computed.

12. An apparatus configured to retransmit signals, comprising:
   means for decoding contents of a unit of received signal;
   means for generating a first feedback signal;
   means for determining a quality metric of said unit of received signal;
   means for instructing said means for generating said first feedback signal to generate said first feedback signal in accordance with said quality metric;
   means for generating a second feedback signal; and
   means for instructing said means for generating said second feedback signal to generate said second feedback signal in accordance with a sequence number of said unit of received signal when a retransmission of said signal in accordance with said quality metric is declared a failure.

13. The apparatus of claim 12, further comprising means for declaring said retransmission of said signal in accordance with said quality metric a failure when:
   said unit of signal is not received within a predetermined number of retransmissions; or
   said unit of signal is not received within a predetermined period measured from a first transmission of said unit of signal; or
   said unit of signal is not received within a predetermined period measured from transmission of a request signal corresponding to said unit of signal.

14. A method for retransmitting signals, comprising:
   decoding contents of a unit of received signal;
   generating a feedback signal;
   determining a quality metric of said unit of received signal;
   generating said feedback signal in accordance with said quality metric; and
   preventing decoding of said unit of received signal if an indication received on a control channel indicates that said unit of received signal is not to be decoded.

15. A method for retransmitting signals, comprising:
   decoding contents of a unit of received signal;
   generating a feedback signal;
   determining a quality metric of said unit of received signal;
   generating said feedback signal in accordance with said quality metric;
   detecting a preamble of said unit of received signal; and
   preventing decoding of said unit of received signal if said preamble indicates that said unit of received signal is not to be decoded.

16. A method for retransmitting signals, comprising:
   decoding contents of a unit of received signal;
   generating a first feedback signal;
   determining a quality metric of said unit of received signal;
   generating said first feedback signal in accordance with said quality metric;
   generating a second feedback signal; and
   generating said second feedback signal in accordance with a sequence number of said unit of received signal when a retransmission of said signal in accordance with said quality metric is declared a failure.

* * * * *